Patented Mar. 6, 1951

2,544,157

UNITED STATES PATENT OFFICE 2,544,157

PURIFICATION OF NICOTINAMIDE

Richard V. Heinzelmann, Kalamazoo, Mich., assignor to The Upjohn Company, Kalamazoo, Mich., a corporation of Michigan No Drawing. Application May 8, 1947, Serial No. 746,877

7 Claims. (Cl. 260—295.5)

The present invention relates to a method for the purification of crude nicotinamide, and is more particularly concerned with such a method whereby nicotinamide meeting U. S. P. specifications may be procured.

The use of nicotinamide as a medical agent is now firmly established. As the importance of nicotinamide in this application has become of greater significance, the requirements as to purity of the medicinal product have been correspondingly raised, with the result that methods which at one time gave a product of requisite purity are no longer satisfactory. Among the present requirements for medicinal grade nicotinamide given in U. S. P. XII are a melting point of 128 to 131 degrees centigrade, an ash content of 0.1 per cent, and pH in the range of neutral to litmus or from 4.5 to 8.3.

It is an object of the present invention to provide a method for obtaining a pure medicinal grade of nicotinamide from material containing nicotinamide along with impurities which render it unacceptable for medicinal use. Another object of this invention is the provision of a method whereby color may be removed from crude nicotinamide. A further object of this invention is the provision of a method whereby acceptably ash-free nicotinamide may be obtained. Other objects of the invention will become apparent hereinafter.

According to customary procedure, nicotinamide is prepared by the action of ammonia on nicotinic acid or an ester thereof. These ammonolysis reactions do not go to completion, and, as a result, nicotinamide, nicotinic acid, ammonium nicotinate, and inorganic salts, such as iron salts, are all present in admixture in the reaction product. Among the methods proposed to give nicotinamide of unstated purity are those of Hultquist, U. S. Patent 2,314,843, and Seibert, Szabo, Wyeno, and Eckhardt, U. S. Patent 2,280,040.

Attempts have been made, as indicated by the cited Hultquist patent, to remove the bulk of the impurities from crude nicotinamide by the employment of calcium hydroxide. However, the last traces of impurities, according to this proposed method, are not removed except by an extended decolorization and crystallization procedure. Without such extensive final purification, the melting point of the product is below that specified by U. S. P. The percentage of ash in the Hultquist sample, however, is not given. Even though the melting point of a nicotinamide sample might be in accord with the U. S. P. specification, the constituents of the inorganic ash are such as not materially to affect the melting point, and may be present in an undesirably high proportion even though the melting point be satisfactory.

A review of the effect of impurities on the physical constants of nicotinamide is given by Mikkelsen in the Archiv. for Pharmacie og Chemie (Denmark) 46, 479–97 (1939). This publication shows clearly that the purity of a sample of nicotinamide is difficult to predict from its melting point, as certain impurities commonly associated with nicotinamide do not produce any depression. This is particularly true of inorganic salts such as calcium nicotinate. Thus, to assure satisfactory purity of the final product, extensive purification procedures have been devised and employed.

In contrast to known methods for the purification of nicotinamide, which require numerous operations and transfers of material, the method of this invention enables the preparation of nicotinamide of acceptable purity from crude product in one or two steps. Numerous operations, such as the tedious decolorizations and crystallizations to obtain a product meeting the U. S. P. XII requirements, which are characteristic of the known procedures, are entirely obviated by the process of the present invention.

The process of this invention essentially comprises (a) treatment of an aqueous monohydric alcohol solution of the crude amide with an alkaline earth base; (b) removal of the alcohol-water mixture until water has been substantially eliminated and remaining alcohol is substantially anhydrous; (c) separation of suspended solids; and, (d) isolation of nicotinamide. The product obtained by such treatment satisfies U. S. P. XII requirements for nicotinamide without further purification. Yields of the amide obtainable by this procedure are usually about 95 per cent of that present in the crude starting material. Alkaline earth nicotinates obtained as a precipitate along with the excess of alkali and inorganic impurities may be recovered by suspending the solid residue in water, and adjusting the pH with strong acids to liberate nicotinic acid from the salt. The nicotinic acid may then be recovered from this solution and further purified, if desired, according to conventional procedure.

In the above-outlined procedure, removal of the alcohol-water mixture is most readily accomplished by distillation; the suspended solids are understood as comprising mainly alkaline earth nicotinate and other inorganic salts; and, isolation of the nicotinamide is usually accomplished by simple crystallization or evaporation of the alcohol therefrom.

If desired, an additional removal of suspended solids may be carried out after the first combination of the alkaline earth base and aqueous monohydric alcohol with the crude amide. In some instances operation according to the method of the present invention with the inclusion of this additional removal of suspended solids may constitute a preferred embodiment of the invention.

The presence of water during reaction between the alkaline earth base and the crude nicotinamide, containing nicotinic acid and other impurities, is essential, otherwise the neutralization is unduly prolonged and incomplete. The nicotinic acid and any unreacted ammonium nicotinate are converted by this treatment into calcium nicotinate, while iron salts which may be present, especially if the preparation of the amide has been carried on in reactors containing iron, are rendered more easily removable at this point. Although calcium salts of nicotinic acid are substantially insoluble in an aqueous organic alcohol solution, the mixture of nicotinamide, calcium nicotinate, and inorganic calcium salts renders the calcium nicotinate and other salts more soluble than if each alone were present. Thus, if the purification should stop at this point, the resulting amide will not meet the U. S. P. requirements for ash.

In order that final traces of inorganic salt may be readily removed, the alcoholic solution should be rendered substantially anhydrous at this point, that is, containing less than about two per cent of water, in order that precipitation of the salts may be substantially complete. The method of the present invention requires that the alcohol, to be suitable for use in the process of this invention, should be capable of yielding upon distillation a substantially anhydrous alcoholic solution of nicotinamide.

Alcohols higher than amyl alcohol are suitable from this standpoint, provided that distillation thereof from the solution be conducted under reduced pressure. The temperature required for distillation of these higher alcohols at atmospheric pressure, however, is usually sufficient to cause some decomposition of the amide with a resulting reduction in yields and impairment of purity of the product. To enable ethyl alcohol to be operative in the process of this invention, it is necessary to add a third component which forms a ternary mixture with the alcohol and water, the ternary mixture boiling lower than that of ethyl alcohol, so the water may be thus removed from the alcoholic solution. Materials such as toluene, which are known to form a minimum ternary boiling mixture with ethyl alcohol and water, are suitable for this purpose. Methyl alcohol is usually used only with the greatest of difficulty, and under ordinarily practicable conditions is usually not adaptable to the process of this invention. A preferred embodiment of this invention contemplates the use of a monohydric alcohol having from three to five carbon atoms, and most especially those with four carbon atoms, i. e., a butanol.

The quantity of water to be used with the alcohol, or, otherwise expressed, the per cent of water in the aqueous alcohol mixture, is capable of considerable variation. The minimum amount is that which is sufficient to allow the neutralization step with an alkaline earth metal hydroxide to go to completion in a reasonable period of time. About three per cent by volume of water appears to be a minimum useful amount, while the maximum quantity of water that is useful is not readily determinable for any given alcohol or set of operating conditions, but, for all practical purposes, should usually not exceed about 25 per cent. For a preferred mode of operation of the process of this invention, the quantity of water should be such that, after the solution is made anhydrous by distillation, the quantity of alcohol remaining is sufficient to contain the amide in the hot solvent. If sufficient alcohol is not present for this purpose, then an amount should be added to obtain a solution of the nicotinamide. The optimum amount of water in the aqueous alcohol mixture is between about 5 and about 15 per cent, preferably about 10 per cent, based on the volume of the alcohol solution.

Calcium oxide or calcium hydroxide are the preferred bases for the neutralization step of the present invention, but other alkaline calcium salts, such as the bicarbonate, are suitable. Similar basic salts of other alkaline earth metals, such as barium and strontium, may also be employed in the practice of the invention. It is usually necessary that an excess of the base, over that required to neutralize any acid and ammonium nicotinate present in the crude mixture, be used. From about 20 to about 50 per cent is a preferred excess for the best operation of the process of this invention.

The process of the invention may be applied in combination with other processes, or carried out in any one of a number of different ways. If it is desired, the iron, color and suspended matter may be removed by various procedures before the base-alcohol treatment is employed. Further, the process may be carried out as if composed of several independent steps, rather than as a single integrated process. Thus, upon treatment of the crude mixture with a base-alcohol suspension, the warm solution may be filtered from the insoluble matter, prior to concentration of the alcohol to give a substantially anhydrous solution, and then again filtered to remove the last traces of inorganic salt; after which the pure amide is isolated. Another embodiment of this invention consists in treating the crude mixture with base and aqueous alcohol, removing the water-alcohol distillate until substantially anhydrous alcoholic conditions are attained, filtering, and removing the pure amide from the alcohol solution, either by evaporation to dryness or crystallization by cooling followed by filtration and evaporation of the solvent to obtain the pure material.

The following examples illustrate various embodiments of the present invention, but are not to be construed as limiting.

*Example 1*

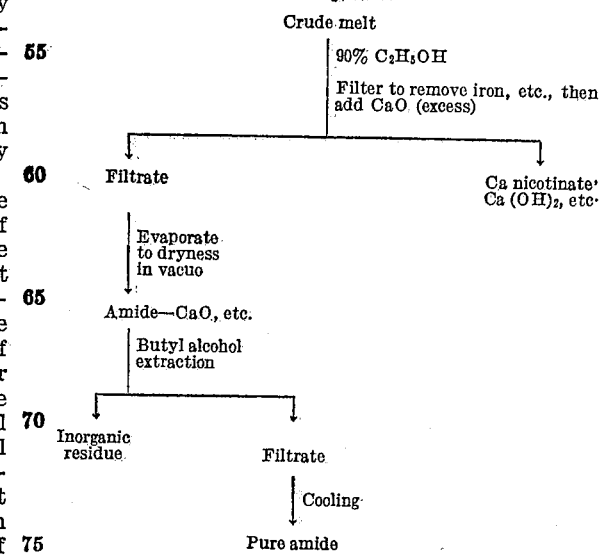

Twelve hundred and forty-seven grams of crude amide was dissolved in three liters of ninety per cent ethyl alcohol. The solution was filtered from 39.2 grams of insoluble matter, and the filtrate was treated with 125 grams of calcium oxide (a 25 per cent excess over the amount required to neutralize the acids and ammonium nicotinate) for a period of 1.5 hours at a temperature between 60 and 70 degrees centigrade. This heating period allows the ammonium nicotinate present in the crude melt to be converted into calcium nicotinate. The hot solution was then filtered, the residue being composed chiefly of calcium nicotinate and calcium hydroxide. The calcium nicotinate is converted to free nicotinic acid and isolated by known procedure. The filtrate was evaporated to dryness in vacuo to yield a white product, which was extracted with 1600 milliliters of butanol at about 95 degrees centigrade. The hot solution was filtered to give a small amount of an insoluble residue, which was discarded. The hot filtrate was cooled to below 15 degrees centigrade, whereupon the first yield of nicotinamide, melting point 129.1-130.1 degrees centigrade, pH 7.0, ash 0.025 per cent, was obtained. The amount of amide obtained in this first yield was about 92 per cent of the amide contained in the original crude mixture. The filtrate was concentrated, whereupon a second yield, amounting to about 5.5 per cent of the total nicotinamide present, was obtained. This product melted at 125.5 degrees centigrade, had a pH of 6.7, and an ash content of 5.6 per cent. Upon evaporation of the mother liquor to dryness, a further 2 per cent of nicotinamide, melting at 120 degrees centigrade and having a pH of 7.3, was obtained.

*Example 2*

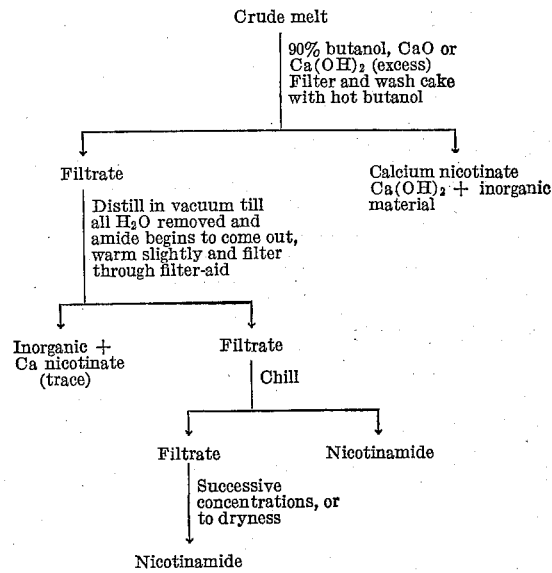

Nine hundred eighty-two grams of crude nicotinamide was treated with 2.5 liters of 90 per cent butanol and a 50 per cent excess of calcium hydroxide at a temperature between about 65 and 70 degrees centigrade for a period of about 2.5 hours. The hot solution was filtered and the residue, consisting of calcium hydroxide, calcium nicotinate, and the amide, was extracted with one liter of hot butanol. This butanol was combined with the 2.5 liters obtained from the original treatment. Fourteen hundred milliliters of alcohol-water distillate was removed from the combined filtrates, and hot solution was filtered to yield two grams of residual calcium nicotinate. The filtrate was cooled to about 15 degrees centigrade, whereupon the first crop of nicotinamide, amounting to about 85 per cent of the theoretical, was obtained. This product had a melting point of 129-129.5 degrees centigrade, pH 6.65, and an ash content of 0.07 per cent. The filtrate from this crop was concentrated until crystals of amide began to separate, and then cooled as before. About 10 per cent of the theoretical amount of nicotinamide in the starting mixture was obtained at this point. This product had a melting point of 128-130 degrees centigrade, pH 6.5, ash 0.05 per cent. Upon evaporation of the filtrate to dryness, 1.3 per cent of crude nicotinamide, melting at 120-4 degrees centigrade with a pH of 7.1 and an ash content of 0.3 per cent, was obtained. This crude product is added to a subsequent run for further purification if desired.

*Example 3*

Two hundred grams of a crude amide melt containing approximately 60 per cent nicotinamide was suspended in 500 milliliters of 90 per cent n-butanol, and the coffee-colored solution was stirred at about 70 degrees centigrade until solution was complete. Thirty-six grams (about 50 per cent excess) of calcium hydroxide U. S. P. and five grams of decolorizing charcoal were added, whereafter the suspension was stirred at 60-70 degrees centigrade under reflux for about 2.5 hours to prevent loss of solvent during the evolution of ammonia and stirring. This suspension was filtered while hot and the residual filter cake was reextracted with 500 milliliters of n-butanol. The combined, almost colorless, filtrates were concentrated by distillation in vacuo until crystals of the amide began to form upon the flask walls at the surface of the liquid. Distillation was then discontinued and the solution warmed until the crystals had redissolved. The solution was then filtered through a thin bed of a diatomaceous earth filter aid to give an almost colorless crystal-clear filtrate. After cooling to about 20 degrees centigrade, the solution was filtered to give the first crop of nicotinamide. The product amounted to 81 grams, had a melting point of 129.5-30 degrees centigrade, a pH of 7.0, and an ash content of 0.07 per cent. The filtrate was concentrated to about 125 milliliters and cooled, whereupon a second crop of nicotinamide was obtained. This material amounted to 22 grams, had a melting point of 129.5-130 degrees centigrade, a pH of 7.0, and an ash content of 0.036 per cent. Upon evaporation of the filtrate to dryness, an additional quantity, about one per cent of the total material, having a melting point of 122-7 degrees centigrade, was obtained.

*Example 4*

Two hundred grams of crude amide, having the same composition as that of Example 3, was treated in a similar manner with the exception that secondary butanol was used instead of normal butanol. The first crop of nicotinamide amounted to 79 grams, melting at 129.5-130.2 degrees centigrade, having a pH of 7.0, and an ash content of 0.08 per cent. The second crop amounted to 20.8 grams, which melted at 129.5-130.1 degrees centigrade, had a pH of 6.85, and an ash content of 0.026 per cent. The crop obtained upon evaporation to dryness amounted to about three per cent of the total obtained, and had a melting point of 126-129.5 degrees centigrade.

*Example 5*

Two hundred grams of crude amide melt, having the same composition as that of Example 3, was treated in a manner similar to that of Example 3 with the exception that isopropanol was used as a solvent. The first crop of amide obtained amounted to 92.5 grams, which had a melting point of 129.6-130.2 degrees centigrade, a pH of 7.9 and an ash content of 0.15 per cent. The second crop of material obtained by evaporation of the solvent amounted to 8.2 grams, which melted at 129.5-130 degrees centigrade, had a pH of 7.1, and an ash content of 0.18 per cent. These two crops were combined and crystallized once from isopropanol to give a product meeting the U. S. P. requirements for ash. The residue obtained upon evaporation to dryness amounted to about three per cent of the total quantity, and had a melting point of 128-130 degrees centigrade.

Another modification of the procedure by which the purification process of this invention may be applied is indicated by the following sequence:

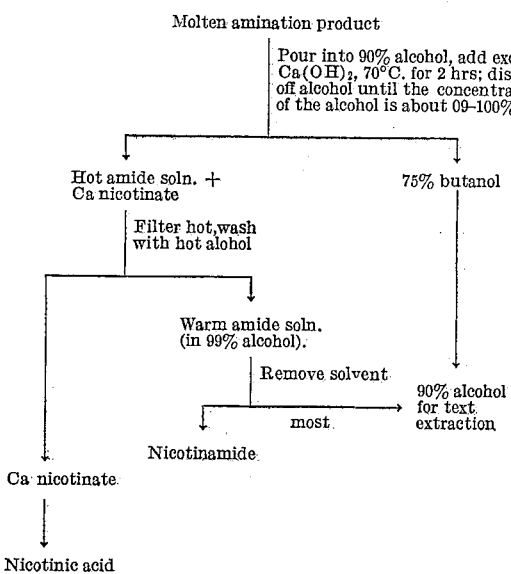

Various modifications may be made without departing from the spirit or scope of the invention, and it is to be understood that I limit myself only as defined in the appended claims.

I claim:

1. In a process for the purification of nicotinamide, the improvement whereby a therapeutically satisfactory product is obtained directly, which comprises: treating an impure reaction product resulting from ammoniation of a compound selected from the group consisting of nicotinic acid and esters thereof, with an excess of alkaline earth base, in amount up to about 50 percent excess over that theoretically required to neutralize the acid and ammonium nicotinate present, and an aqueous polycarbon monohydric alcohol containing at least 75 percent alcohol, said alcohol containing from three to five carbon atoms, removing that amount of water which is necessary to bring the mixture to a state wherein it contains less than about two percent water; separating undissolved solids from the substantially anhydrous mixture; and thereafter separating the thus-purified nicotinamide from the resulting mixture by crystallization.

2. The process of claim 1, wherein the alcohol is a butanol.

3. In a process of claim 1, where the alcohol is n-butanol.

4. In a process of claim 1, where the alcohol is secondary butanol.

5. The process of claim 1, wherein the volume of water in the aqueous alcohol is between about 5 and about 15 per cent of the volume of the aqueous alcohol.

6. The process of claim 1, wherein the excess of alkaline earth base is between about 20 and about 50 per cent over that required to neutralize the acid and ammonium nicotinate present.

7. In a process for purifying a reaction mixture containing nicotinamide resulting from the ammoniation of a compound selected from the group consisting of nicotinic acid and esters thereof, the steps which include: treating said mixture with calcium hydroxide in an amount between about 20 and about 50 percent over that theoretically required to neutralize the acid and ammonium nicotinate present, and with aqueous n-butanol containing between about 5 and 15 percent water by volume; distilling the resulting mixture at a temperature below the decomposition temperature of nicotinamide until a solution containing less than about two percent water is obtained; removing the undissolved solids; and, thereafter separating the nicotinamide from the thus-obtained mixture by crystallization.

RICHARD V. HEINZELMANN.

REFERENCES CITED

The following references are of record in the file of this patent:

UNITED STATES PATENTS

| Number | Name | Date |
|---|---|---|
| 2,280,040 | Seibert et al. | Apr. 14, 1942 |
| 2,314,843 | Hultquist | Mar. 23, 1943 |
| 2,453,496 | Couch et al. | Nov. 9, 1948 |